R. A. FESSENDEN.
METHOD AND APPARATUS FOR PRODUCING ALTERNATING CURRENTS.
APPLICATION FILED DEC. 2, 1914.

1,265,068.

Patented May 7, 1918.

WITNESSES:

INVENTOR:
Reginald A. Fessenden
By
his attorneys.

UNITED STATES PATENT OFFICE.

REGINALD AUBREY FESSENDEN, OF BROOKLINE, MASSACHUSETTS, ASSIGNOR TO SUBMARINE SIGNAL COMPANY, OF WATERVILLE, MAINE, A CORPORATION OF MAINE.

METHOD AND APPARATUS FOR PRODUCING ALTERNATING CURRENTS.

1,265,068.          Specification of Letters Patent.       Patented May 7, 1918.

Application filed December 2, 1914. Serial No. 875,071.

*To all whom it may concern:*

Be it known that I, REGINALD A. FESSENDEN, of Brookline, in the county of Norfolk and State of Massachusetts, a citizen of the United States, have invented a new and Improved Method and Apparatus for Producing Alternating Currents, of which the following is a specification.

Heretofore alternating currents have been produced by alternating current dynamos or by commutators in which a continuous current was broken and reversed in direction.

The former method requires special machinery so that even if there be 100 H. P. of direct current available, a 100 H. P. alternating current dynamo is also required.

The latter method would be much simpler and less expensive, but has the disadvantage that the breaking of the continuous current, owing to the self-induction of the circuit, produces very severe sparking at the contacts, which renders it for most purposes impracticable.

The invention herein described has for its object the production of alternating currents from direct currents in a simple, economical and efficient manner, and has also for its object the production of a wave form adapted for special purposes.

In the accompanying drawings forming a part of this specification, are shown diagrammatically arrangements for carrying out my invention.

Figure 1:
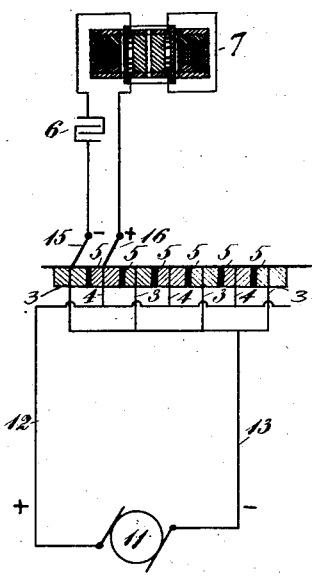
Figure 1 shows diagrammatically the primary circuit including a continuous current generator and a secondary circuit comprising a condenser and the means to be operated together with a pole changer.

Briefly stated, the invention consists in that instead of allowing a continuous current to establish itself in the circuit and then breaking it after it has established its magnetic field, with the consequent destructive sparking, and then allowing it to establish itself in the opposite direction and breaking it again, a condenser is located in the circuit in which it is desired to create the alternating current, and the continuous current is connected to this condenser so as to charge the condenser.

As soon as the condenser is charged the flow of current stops of itself and it is only then that the circuit is broken, there being now no sparking, and the continuous current is then connected so as to charge the condenser in the opposite direction, and when it is charged in the opposite direction and the charging current has ceased to flow, the circuit is broken once more and so on In this way it is possible to produce alternating currents of large horse power from continuous currents, and without destructive sparking; in fact, in the apparatus constructed and used by the applicant, no sparking at all is visible when operating at full load.

In the drawing illustrating the invention, 11 is a continuous current dynamo which may be of 110 volts; 12 is the positive lead and 13 the negative lead; 3, 4 and 5 are segments of a rotating commutator or other pole changer.

The segments 3, 3, 3 are connected to each other and to the negative pole, and the segments 4, 4, 4 are connected to each other and to the positive pole. The segments 5, 5, 5, 5, 5, 5, 5 are insulated segments.

7 is a device which is to be operated by alternating current, for example, an oscillator of the type described in applicant's United States application for a patent, Serial No. 770,857, filed May 31, 1913, United States Patent No. 1,167,366.

6 is a condenser, and 15 and 16 are brushes.

It will be seen that when the brush 15 rests on the segment 3 and the brush 16 on the segment 4, the condenser 6 will be charged with its lower plate negative, and that while it is being charged there will be a rush of current in one direction through the oscillator circuit. When the charging is accomplished, the commutator moving to the left, the brushes 15 and 16 will move off the segments 3 and 4, but no spark will be produced because as soon as the condenser 6 was charged the current flow stopped of itself.

Having moved off the segments 3 and 4 the brushes 15 and 16 move onto the segments 5 and 5 in which position they are insulated.

As the commutator continues to move to the left, the brush 15 makes contact with the segment 4 and the brush 16 with the segment 3, whereupon it will be seen that the continuous current now flows on through the brushes and first annuls the charge left in the condenser 6 and then charges it in the opposite direction, so that by this reversal double the charging current is obtained and therefore double the alternating current to what would be obtained by a simple charge instead of a reversal of the charge.

In the apparatus actually constructed the commutator revolved about 1000 times per minute and the time taken by each segment in passing under the brush was about 1/2000 of a second. As is well-known in the art (see Bedell, *Alternating Currents*), the time constant of a circuit is the time in which said circuit discharges itself nearly completely, and therefore, in order that a circuit may be discharged completely in a given interval of time the time constant of the circuit must be substantially less than said interval of time.

The time-constant of the oscillator being 1/10000 of a second, the condenser 6 was fully charged before the brushes had traveled more than one quarter of the way across a commutator bar; and consequently the current had entirely ceased to flow before the circuit was broken.

It will be obvious that if the time constant had been 1/1000 instead of 1/10000 the condenser would not have finished charging before the brush passed off the commutator bar and there would have been sparking, and that obviously to prevent this sparking the time constant should be half the frequency or less.

In order to prevent oscillatory charges of the condenser 6 the virtual resistance of the oscillator and its connections was made sufficient to damp out oscillatory discharges, though in some cases the oscillatory discharge was permitted to exist and the commutator rotated at such speed as to utilize the natural oscillations.

Figure 2:
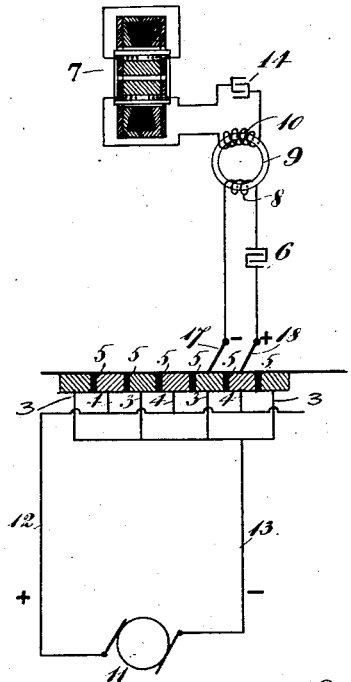
Fig. 2 shows a modification more fully described below.

Fig. 2 shows another arrangement for utilizing the commutator in which 9 is the transformer, 8 being its primary, 10 its secondary, 6 a condenser in series with the primary and 17 and 18 brushes resting on the commutator. In this arrangement it is preferred to use a condenser 14 in the secondary of the transformer so as to reduce the time-constant of the transformer sufficiently to allow the condenser 6 to be charged substantially before the current is broken.

This apparatus the applicant has used in practice with very satisfactory results, a small commutator 6″ in diameter and condensers occupying a cube of approximately 4″ on the side, having taken the place of a 2 K. W. 500 cycle motor generator set, formerly used with the oscillator.

What I claim as my invention is:—

1. A method of producing alternating current from direct current which consists in first adjusting an electric current circuit containing a condenser so as to have a time constant less than one-half the period of the frequency desired, thereby enabling the condenser to be charged in less time than the time of one-half the period of the frequency desired, then connecting by means of a pole changer the adjusted electric current circuit to a source of continuous current, thereby charging the condenser of the said electric current circuit in one direction, then insulating the said current circuit, thereby preventing the condenser from discharging, then connecting the said electric current circuit in a reverse direction to a continuous current circuit, thereby annulling the residual charging of the condenser and giving it a charge of opposite polarity.

2. Apparatus for producing from a direct current an alternating current, which comprises a commutator, a source of direct current supply the terminals of which are continuously connected to the same terminals of said commutator, and an electric circuit containing a condenser, the terminals of said electric circuit being adapted to be connected with the alternately polarized terminals of said commutator for a period of time greater than the time required to charge the condenser, whereby the direction of the current in said electric circuit and the charge in said condenser are electrically reversed.

3. Apparatus for producing an alternating current from a direct current, comprising a source of direct current, a commutator the terminals of which are permanently connected to the terminals of said direct current source and an electric circuit containing a condenser, the terminals of said electric circuit being adapted to engage alternately the terminals of said commutator whereby said condenser will be charged and its charge reversed alternately, the time-constant of said condenser being less than one-half the period of alternation.

REGINALD AUBREY FESSENDEN.

Witnesses:
 A. M. GLASS,
 T. SELBY WARDLE.